United States Patent [19]

Thomas

[11] 4,263,504
[45] Apr. 21, 1981

[54] HIGH DENSITY MATRIX CODE

[75] Inventor: Jacob E. Thomas, Ithaca, N.Y.

[73] Assignee: NCR Corporation, Dayton, Ohio

[21] Appl. No.: 62,650

[22] Filed: Aug. 1, 1979

[51] Int. Cl.³ .................... G06K 7/14; G06K 19/06
[52] U.S. Cl. .................... 235/454; 235/487; 235/494
[58] Field of Search ............... 235/487, 494, 454

[56] References Cited

U.S. PATENT DOCUMENTS

| | | | |
|---|---|---|---|
| 3,206,592 | 9/1965 | Nadler | 235/487 |
| 3,514,616 | 5/1970 | Kolb | 235/487 |
| 3,588,452 | 6/1971 | Kee | 235/454 |
| 3,660,641 | 5/1972 | Levasseur | 235/494 |
| 3,776,454 | 12/1973 | Jones | 235/494 |
| 3,845,279 | 10/1974 | Rosdorff | 235/494 |

*Primary Examiner*—Daryl W. Cook
*Attorney, Agent, or Firm*—J. T. Cavender; Wilbert Hawk, Jr.; George J. Muckenthaler

[57] ABSTRACT

A machine-readable matrix-type code has either repeated or non-repeated dot patterns in one direction representing digital characters which are read by a sensor moved in a direction which is generally normal to the patterns. The patterns of the code may be formed in a manner wherein the sensor views a portion of repeated patterns, or the code may be of lesser magnitude wherein the entire non-repeated pattern area is covered by the field of view of the sensor.

8 Claims, 9 Drawing Figures

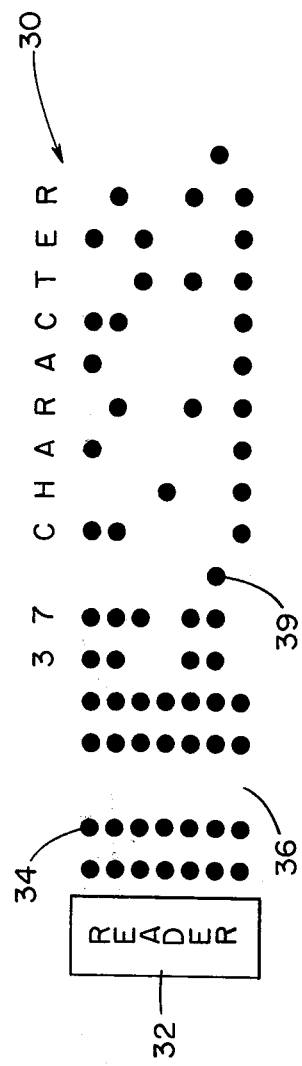
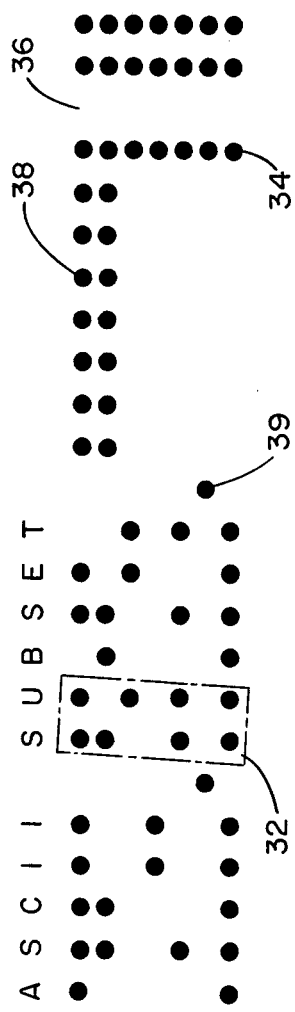
FIG. 3A
FIG. 3B

HIGH DENSITY MATRIX CODE

BACKGROUND OF THE INVENTION

In the field of machine-readable information code, the bar code is one of the most widely recognized by reason of being used on numerous consumer articles and in other applications. One bar code, being the universal product code (UPC), includes different width bars which are spaced one from another in an overall pattern on a consumer article for scanning along a path of travel by a moving reader or sensor. Contrariwise, the path of travel of a consumer article carrier with respect to a reader or sensor could be used wherein the reader or sensor is maintained stationary for scanning articles moving therepast. The different width vertical bars and the spaces therebetween make up the UPC scannable symbol, and optical font characters make up the corresponding human-readable characters. The vertical bars and spaces reflect light emitted by an optical scanner which reads the symbol-marked products—such UPC symbol identifying the manufacturer and the product.

Machine readable codes may also be triangular-shaped of equal length bars or they may be of unequal length wherein the sensor identifies characters by reading along the triangles or across the various lengths thereof.

Another form of bar code is the color bar code which may consist of black, green, and white bars arranged in various patterns for representing characters.

A further type of code includes the optical character recognition type (OCR) which may be both machine and human-readable and is utilized where both readings are desirable.

Another code pattern utilizes a matrix which may consist of squares, dots, circles or like indicia which is machine-readable and which is useful for identifying and printing of characters.

The above codes are generally formed along a line wherein the reader or sensor follows a straight path across the code wherein the code is directed and disposed in a path along a line coinciding with the direction of movement and viewing of the sensor. In most prior art codes, the entire pattern usually must be sensed and the relation between the pattern and the sensor usually must be fixed to properly recognize the characters, however, the hand held wand readers allow some variation from a fixed path or line of travel.

The basic concept underlying recording is the creation of patterns in or on a record medium so that one or more patterns can be taken to represent one or more characters. The patterns are sequentially detected by appropriate sensor arrays when there is relative motion between the record medium and the array.

Many applications exist for the several printed codes mentioned above, which codes have high information density and are machine readable. While none of such codes can be used for all applications, the following parameters or requirements specify a particular code for very wide usage. The code should be high density for printing of at least ten alphanumeric characters per linear inch, the code should be readable with a light weight, low cost, and preferably hand-held wand, and the first pass read rate should be at least or greater than 95%. The character substitution error rate should be less than one in ten million after all error detection and error correction has taken place, and the code should be printable with a low cost, computer controlled, widely available printer such as a dot matrix printer.

A dot matrix printer is defined as one capable of printing dots on a record medium at selected points on an X-Y grid and representative types of such printers include a wire or needle matrix impact printer, a thermal non-impact printer, or an ink jet non-impact printer. Some of these printers utilize dual grids in which characters are located on a coarse grid having center-to-center spacing 0.1 inch horizontal and 0.16 inch vertical, while within a character, dots are located on a fine grid with both horizontal and vertical spacing of 0.015 inch with typical characters printed at seven dots high and five dots wide.

In many cases of the prior art, when the reading depends essentially on multiple sensing elements, it is seen that the code scheme requires that the reader or sensor array have elements in an order where any one element always senses the same portion of the particular pattern, or stated differently, the allowable unwanted lateral displacement of the sensor with respect to the record medium must be kept less than the lateral dimension of a sensing element—the lateral dimension being along a direction perpendicular to the relative motion of the medium and the sensor. In specific applications, for example, where the reader and the symbols are under machine control, the reader (read head) must read the same track on magnetic tape, or the photocell or contact must read the same bit of each character on paper tape. That is, the sensor array must be properly aligned with respect to the pattern so that there is no ambiguity about the meaning of the signal coming from each element of the array.

Representative prior art which is considered relevant to the subject matter of the present invention includes U.S. Pat. No. 3,532,859, issued to J. Laplume on Oct. 6, 1970, which discloses an identifying system using optical codes wherein a plate or card comprises a plurality of squares in characteristic binary code patterns of non-reflective and reflective surfaces. The reflective surfaces may comprise a multiplicity of small spherical beads or a multiplicity of convex elements alongside the non-reflective or light-absorbing surfaces and be read or sensed by an illuminating and sensing unit.

U.S. Pat. No. 3,558,859, issued to F. W. Dilsner et al. on Jan. 26, 1971, shows an automatic reading system for record media having encoded data of perforated and of printed codes. The perforated code includes legible and illegible type arranged in a matrix pattern and the printed code includes a bar code and a marking code.

U.S. Pat. No. 3,860,790, issued to S. J. Reckdahl on Jan. 14, 1975, shows a data processing form which has a plurality of printed indication areas for use with optical sensing apparatus. Printed symbols extend uniformly within a certain dimension and have a printed area of an optical density which is selected in relation to the sensing means.

U.S. Pat. No. 3,898,434, issued to A. G. Bigelow et al. on Aug. 5, 1975, discloses a machine-readable coded member formed of pattern areas with each area corresponding to a character. Each area is divided equally into rectangular portions and the presence or absence of indicia in selected portions represents a designated character. At least two pattern portions of each area are aligned along a path of travel of the coded member with respect to the scanner or reader and an index mark is placed on a line which is perpendicular to the path of travel of the document.

U.S. Pat. No. 4,114,033, issued to A. Okamoto et al. on Sept. 12, 1978, discloses a number of bar codes recorded in dual directions on an information card. A plurality of bar codes comprising one group bar code are arranged in one direction which is orthogonal to the bar symbol and a plurality of group bar codes are arranged in the other direction in which the bar symbol extends. The group bar codes are sequentially scanned for the recognition thereof.

And, U.S. Pat. No. 4,130,243, issued to R. L. Stevens on Dec. 19, 1978, discloses a machine-readable optical printed symbol format that is generally hour-glass shaped and consists of nine elements of alternate bars and spaces vertically arranged in a manner wherein the length of the bars and the spaces is greater at the top and bottom of the symbol and decreases to a minimum point at the middle of the symbol.

SUMMARY OF THE INVENTION

The present invention relates to machine-readable codes and more particularly to a high-density code of the dot matrix type. The code consists of a plurality of dot patterns in columnar fashion wherein each of the patterns in a column represents a character with the dot patterns being preferably repeated in one direction. The dot matrix patterns are read by a reader or sensor in a direction of reading which is the X or abscissa direction and which is normal to the direction of the repeated as well as non-repeated patterns which are in the Y or ordinate direction. The code is constructed and oriented in a first or preferred manner wherein the reading or identification of each of the matrix patterns may be accomplished with a reader having a field of view which covers a portion of the entire code area or in a second manner with a reader which views a non-repeated code and specifically which includes and covers an area in excess of one matrix pattern in the Y direction.

The code is made up of dots spaced from each other in the X and the Y directions, with the dot columns representing characters digitally in the manner of regularly spaced parallel columns of dots and with various sequences of fully-populated columns and empty columns indicating the start and finish of a symbol or of a plurality of characters. The character code extends in the Y direction and the binary information is conveyed by sensing or reading the presence or absence of dots at specific places or locations within the dot columns and within the matrix pattern for each character or characters.

In view of the above discussion, the principal object of the present invention is to provide a machine-readable matrix code in a simple configuration.

Another object of the present invention is to provide a matrix code of high density for conveying binary information.

An additional object of the present invention is to provide a matrix code in a repeated pattern wherein reading means can be randomly moved across the code within a given range in one direction.

A further object of the present invention is to provide a matrix code in repeated patterns in one direction to provide for correction of tracking error of the code-reading means.

Another object of the present invention is to provide a code which can readily be printed by dot matrix printers commonly used to print computer output data.

A further object of the present invention is to provide a matrix code with inherent error detection features.

Additional advantages and features of the present invention will become apparent and fully understood from a reading of the following description taken with the annexed drawing.

BRIEF DESCRIPTION OF THE DRAWING

FIGS. 3A and 3B represent a plan view of the matrix code shown in FIGS. 2A and 2B and depicting a particular application thereof, along with a reader for sensing the code;

DESCRIPTION OF THE PREFERRED EMBODIMENT

Figure 1A:
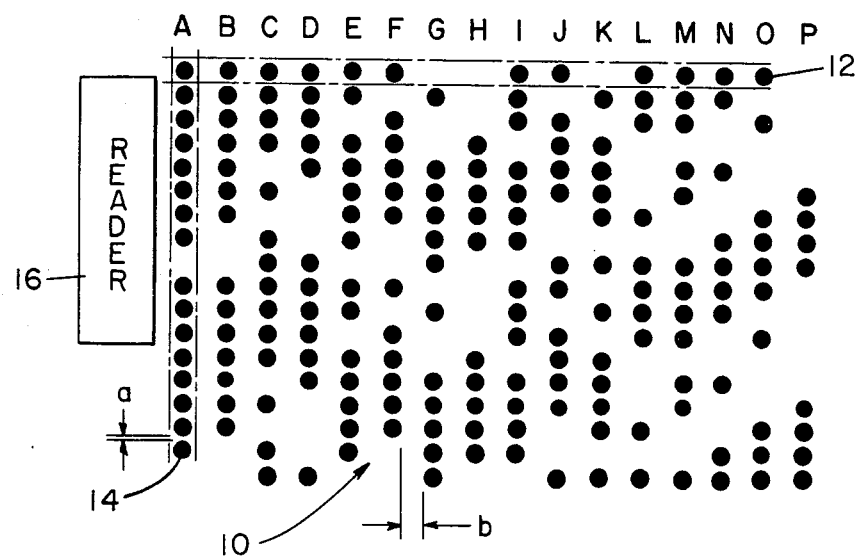
FIGS. 1A and 1B represent a plan view of a matrix code with repeated patterns in a preferred embodiment of the present invention, together with a reader for reading the code.

Prior to describing the several figures, it should be stated that the fundamental concept of the present invention is to represent characters digitally by regularly and evenly spaced parallel columns of dots and where binary information is to be conveyed by presence or absence of a dot at any specific location on the record medium or paper. The possible locations for dots will be spaced along the columns so that the minimum dot-to-dot distance in one column is the same as the distance between columns and the distance between rows of dots, although other column and row spacings may find useful application. Thus the possible locations for dots form a regular array, grid or matrix with the dot columns running vertically and the dot rows running horizontally.

Detection of the dots is to be performed by an optical sensor or reader which has a similar, but possibly dimensionally different, grid structure, one axis of which is aligned with the code grid within a few degrees. As a special case, the grid structure of the optical sensor may be a single column of sense elements arrayed approximately in the vertical or Y direction. If the sensor is in a hand-held wand, the mechanical, electronic and digital systems must correct for or prevent errors arising from non-ideal orientation and motion of the wand. In such a wand or like hand-held reading device, accurate alignment is extremely difficult or almost impossible to achieve and, generally, any one element of the sensor array scans a different part of each code pattern each and every time the device makes another sweep across the record medium. The system must be capable, within limits of course, of making sense of and identifying the data regardless of what part of the sensor array passes over any particular part of the character pattern. Additionally, dot matrix printers are not perfect in their certainty of laying down dots of required optical contrast and spurious "dots" may appear which are caused by dirt or by defects in the record medium or paper.

The matrix code refers to the representation of one character by a single column of marks regularly spaced in a line, one class of mark representing binary one and a second class of mark representing binary zero. A black mark can represent binary one and a white mark or absence of black can represent binary zero, with the array of printed rows and columns of dots being a symbol and the overall invention being identified as a symbolic coding method.

In an arrangement of vertical dot columns of code, angular tracking error or drift may be corrected by repeating the n bits of the code for one character several times in a single column. The vertical height of the sensor or reader in the plane of the paper will be such that at least one full n-bit code height is detected regardless of the position of the sensor along the column of dots. Codes which can be converted into one another by cyclic permutation will be considered equivalent and will represent the same character or data. Cyclic permutation indicates or signifies that any bit may be the start bit when the code is arranged in an imaginary circle of exactly n bits around the circumference, such codes, which can be uniquely recognized without reference to a particular start bit, will be referred to as cyclic patterns or codes. Thus if the code is repeated several times in a vertical column by joining start to end bits, the reader or sensor can select any n bits from the vertical column of dots and uniquely identify the code. In this manner the sensor is narrower than the repeated vertical rows of dots and the code represents a redundant pattern.

Cyclic code patterns have inherent error detection capability of two types. First, since the machine will reject any code which is not a cyclic pattern and since the cyclic patterns are a small fraction of all possible patterns having the same number of bits, errors consisting of unwanted marks on the medium or of missing dots have a low probability of changing a valid cyclic pattern into another acceptable pattern. Such errors will thus be detected and an alert can be given to the operator. Second, since the reader is larger in vertical extent than the length of one complete n-bit pattern, the machine can recognize more than one contiguous group of n dots and spaces to be decoded. All of these groups in any one column can be decoded during the reading period and must correspond to the same character. If not, the machine will signal an error.

Velocity error is corrected by including repeated rows of dots in a vertical direction in the printed symbol which are not recognized as code but as timing or fiduciary marks. As an example, a three-row combination of all white, all black, and all white marks could easily be sensed by a sensor or wand. The rate of occurrence of such marks would be analyzed to give probe velocity and thus used to generate a data clock. Further, the inclination or skew of the probe can be deduced from the sequence of times at which different sense elements of the probe pass over any one timing row. All of the data in the following codes would be corrected for the timing errors introduced by the slant or skew of the reader on the assumption that the angle was changing slowly.

As an example, if a code is represented by 11 dots on 0.015 inch centers repeated four times in a vertical direction, the symbol is 0.66 inch high and the sensor field needs to be approximately 0.20 inch to see the 11 significant dots and have one or two guard dots on each end. The 11 cyclic dots can be arrayed in 188 unique ways and can represent a complete upper and lower case alpha font with numerics and symbols.

It is possible to provide 66 vertical columns of such dots per horizontal inch and if three columns of each set of 11 columns are used for timing marks, the symbol will represent 48 characters per horizontal inch. If the symbols are spaced on one inch centers vertically and 7 inches of the paper width is used, 70 inches of symbol or 3360 characters per 8½ inch by 11 inch page can be printed, which is about equal to the number of characters on a single spaced typewritten page of human readable print.

In the preferred embodiment of the invention, the reader or sensor field of view is less than the length of a repeated vertical column of dots. The column of dots may contain as many as 50 dots but any 11 dots in sequence can be decoded to represent the character in question regardless of which dot is taken as the first bit of the code. If, for example, the reader or sensor is wide enough to always detect 13 dots reliably, the logic can pick out a sequence of 11 dots and uniquely assign the proper character. In this manner, the operator of the sensor can drift from top to bottom or from bottom to top of the repeated symbol without making errors as the symbol is scanned from left to right or from right to left all within the capabilities of the system.

A second embodiment or an alternate approach, especially applicable if limited fonts are adequate, is to print codes having the same number of bits as the number of wires in a conventional print head, namely 7, 8 or 9 print wires, and which can print dots simultaneously in a vertical direction. In a typical 7 wire configuration, six dots per code can be used for a 64 character set with one dot reserved for the start position. Additional dots can be used for error checking.

Symbols made up of such codes would be printed in a single pass of the print head and each vertical column of dots would contain a single normal binary code without cyclic repetition. The sensor field would need to extend far enough above and below the printed symbol to allow for normal drift during the sweep of the sensor or wand reader.

The second scheme is simpler than the first scheme by reason of the code dots having a one-to-one correspondence with the bits of a simple binary code, such as ASCII. The field of view of the sensor is sufficiently wide to overlap the code symbol above and below into regions of the record medium where there are no printed dots. The extra width of the sensor is sufficient to allow for operator drift while sweeping or scanning the code.

There is an implication in all suggested code systems that allows for misalignment between sensor and code, which is that errors must not arise when the field of view of one sense element overlaps two pattern elements. One solution is to use a fine "grained" sensor so that each pattern element will always encompass the full field of view of at least one sensor element. The system logic then decides which sensor elements are "pure" in that they convey the signal from only one pattern element, and which sensor elements are "mixed" must either be corrected or ignored. It is believed that, when applied to the present invention, the center-to-center spacing of view fields of the sense elements must be less than or equal to one-half the minimum center-to-center spacing of printed dots.

The choice between symbols with repeated codes to be read by a sensor having a field of view shorter than the code column of dots and symbols with non-repeated codes to be read by a sensor having a field of view longer than the code column of dots depends upon the cost of the sensor and the decoding hardware for the two embodiments. The ease of following the code during hand sweeping of the wand reader also is a determining factor of which code to use.

In the repeated or redundant pattern case, the reader or sensor sees only a part of the pattern but is capable of decoding such pattern. In the non-repeated or overlap case, any part of the sensor is capable of completely decoding the pattern as long as the entire pattern is covered.

As mentioned previously, matrix printers selectively deposit dots on the record medium or paper at locations which specify a regularly spaced grid and the presence or absence of such dots at the spaced locations along one column of the grid represent the bits of an n-bit binary number or code. The binary data is repeated several times along each column and only those binary codes are used which can be uniquely recognized in any cyclic order without reference to most and least significant bits. The printed codes are read with the optical reader or sensor which has at least n optical elements arrayed in a line approximately parallel (within the precision of hand alignment) to the columns of the code. The sensor is moved in a direction approximately perpendicular to the code columns so as to detect the sequence of codes.

Figure 1B:
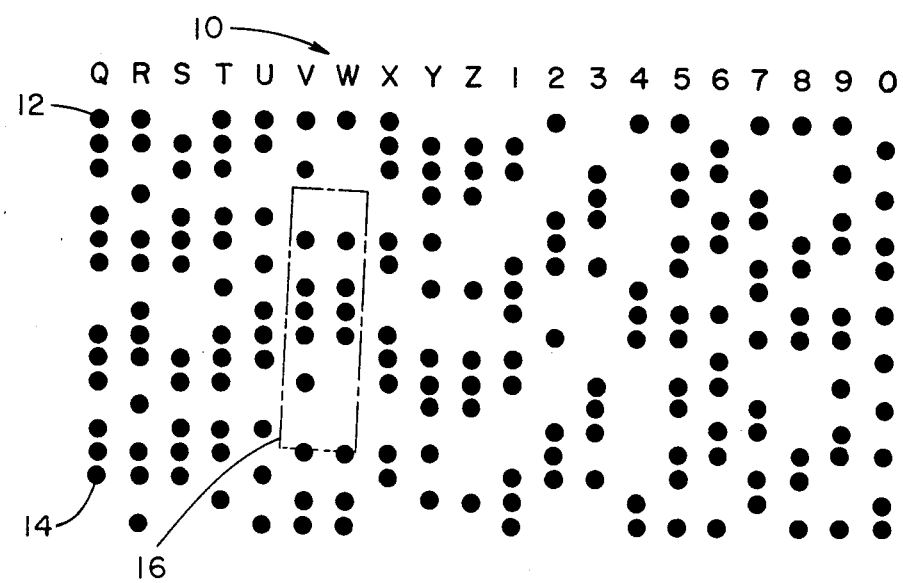

Referring now to the several Figures of the drawing, FIGS. 1A and 1B illustrate a preferred embodiment of a dot matrix code 10 of the present invention wherein such code comprises rows 12 of dots in the X direction and columns 14 of dots in the Y direction. The particular code illustrated shows a combination of dots and spaces totaling nine and arranged in the Y direction to comprise a 9-bit code for each character. Reading or counting from the top of FIG. 1A and in the case of the letter "A," the code has eight vertical dots and a space, the letter "B" has seven vertical dots and two spaces and the letter "C" has four vertical dots, a space, a single dot, a space and two dots. The code for letter "C" could equally well be considered to cover six dots, a space, a single dot and a space. The presence of dots or the absence of dots make up the matrix code for the respective letters and numerals. A 9-bit code is usually taken to represent a maximum of $2^9$ or 512 possible different characters. However, only 58 of these characters, excluding full and empty columns, are unique in cyclic form.

It is readily seen from the dot matrix codes of FIGS. 1A and 1B that the 9-bit code for each letter or numeral is repeated twice in the Y direction to form the redundant pattern. The spacing of the dots is arbitrary and is employed specifically for convenience in showing the dots separated from each other in the Y direction for ease of illustration and for permitting adequate space for showing the letters and numerals in the X direction. For example, the spacing or distance between dots, as represented by "a" and by "b" may be reduced to zero so that the adjacent dots are touching, as can be accomplished where the codes are printed by a dot matrix printer of any one of the several kinds as mentioned above. A common matrix printer may have almost any desired dot spacing in the X direction and with little modification any desired dot spacing in the Y direction. A reader 16 is shown at the left side of FIG. 1A for reading the dot matrix code, which reader, for example, may be a wand-type reader as manufactured by Caere Corporation, of Mountain View, Calif. The reader 16 has a field of view sufficiently wide to cover more than nine dots and/or spaces in the Y direction so as to always see a full 9-bit code, regardless of how the wand is positioned vertically within the code area. As long as the reader is moved along a path through the repeated dot matrix code, the character represented by the vertical column of dots and spaces is sensed or read and retrieved for future use. The reader 16 can move in a slanted or skewed or skewed manner across the code pattern, as seen in FIG. 1B, wherein it is well-known that a hand-held wand reader does not always travel along a precise line or plane when reading the code. In this respect, the logic of the control system is intended to correct for the skew of the reader.

Figure 2A:
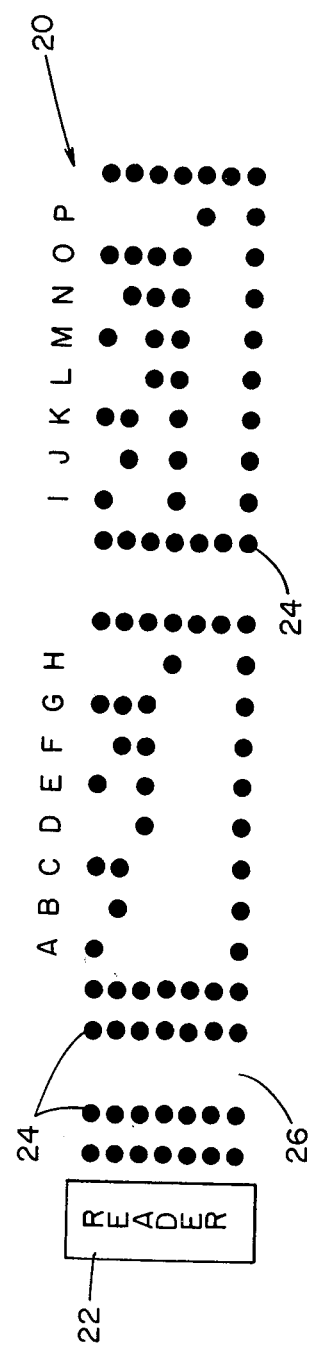
FIGS. 2A and 2B represent a plan view of a matrix code and a reader having a field of view for sensing the code.
Figure 2B:
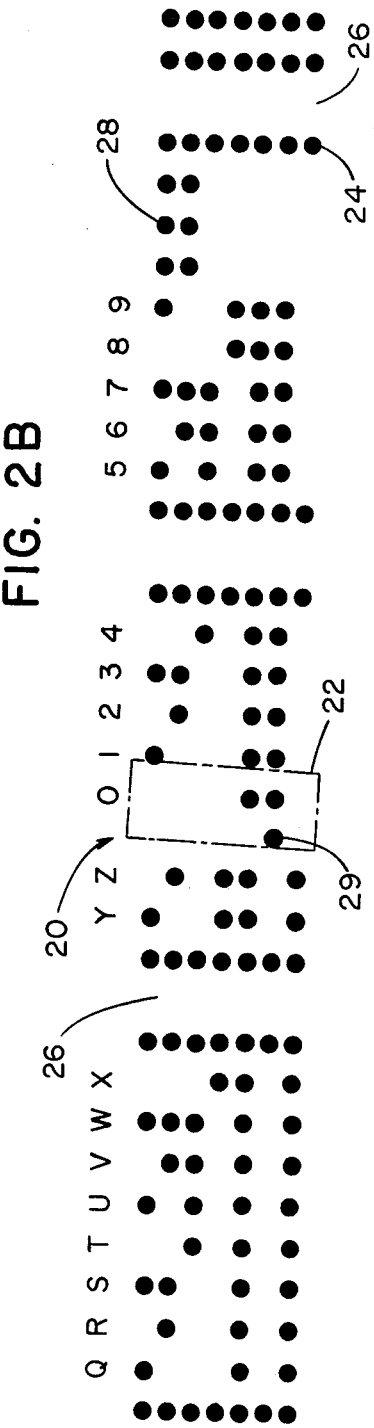

FIGS. 2A and 2B illustrate an overlap pattern of a dot matrix code 20 wherein the code may be printed by means of a seven element dot matrix printer (not shown) in the printing of the seven dot high code element. The codes for the respective letters and numerals are illustrated as the presence or absence of dots in a lesser height of the code. A reader 22 must overlap the top and bottom of the code symbol so that the field of view of the reader includes the height of the 7-bit code. Again, as illustrated in FIG. 2B, the reader 22 may be skewed in its travel along the code and the logic will correct for this condition. A fully populated column 24 of dots at the start of a symbol and a blank column 26 adjacent thereto indicate both start and finish or end of a symbol. Various sequences of full and blank columns are used to signify start and finish of a symbol or division of the symbol into blocks of data, e.g. a pair of full columns, a blank column and a single or a double column of dots. The full and empty columns 24, 26 may divide blocks of code and the spacing of the columns is used to determine wand speed to assist in decoding. The repeated double dots 28 indicate end of transmission. A column containing a single dot 29 indicates a space or a blank character.

FIGS. 3A and 3B illustrate a particular application of the overlap code 30 in spelling out a "37 character ASCII subset" by reading or sensing thereof by a reader 32. A full column 34 of dots and an adjacent blank column 36 in a pattern or sequence (FIGS. 3A and 3B) indicate start and finish of the symbol. The repeated double dots 38 indicate end of transmission and a column containing a single dot 39 is a space or a blank character.

Figure 4A:
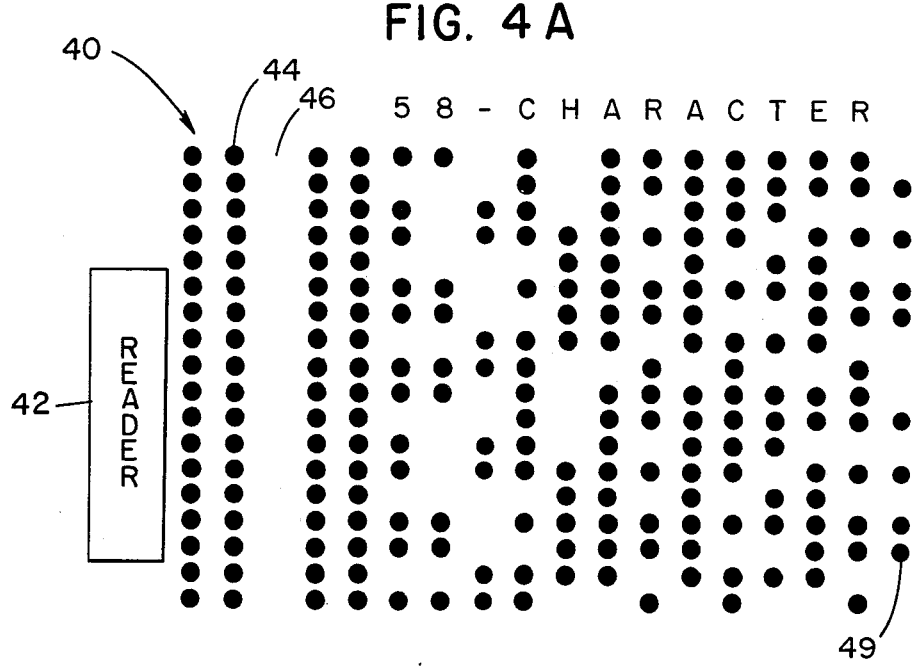
FIGS. 4A and 4B represent a plan view of the matrix code shown in FIGS. 1A and 1B and depicting a particular application thereof, along with a reader for sensing the code.
Figure 4B:
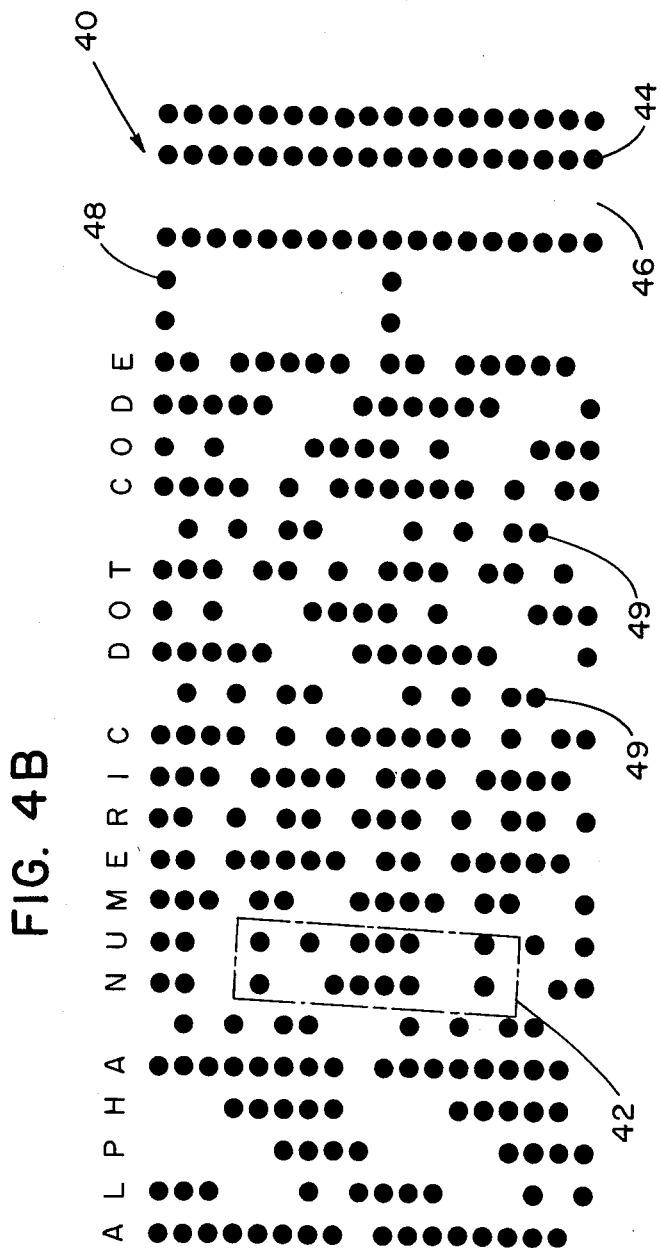

FIGS. 4A and 4B illustrate a particular application of the redundant pattern code 40 in spelling out a "58-character alpha numeric dot code" together with a reader 42. In similar manner, a fully populated column 44 of dots and an adjacent blank column 46 indicate start and finish of the symbol. The single dot 48 is end of transmission and the column of dots 49 is a space or blank character of the symbol.

Figure 5:
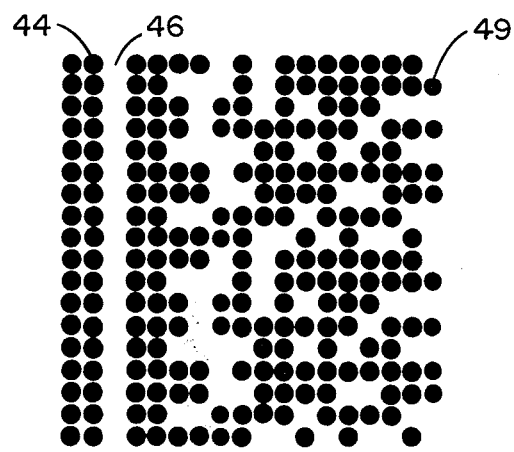
FIG. 5 is the same view as FIG. 4A with the code shown in evenly spaced dot matrix manner.

FIG. 5 represents the identical code as FIG. 4A with the code shown in evenly spaced dot matrix manner.

FIGS. 2A, 2B, 3A, 3B, 4A and 4B illustrate start and finish of the symbol by use of a pair of fully-populated columns, a blank column, and another pair of fully-populated dot columns at the left side of the code for indicating start of code. The right side of the code shows a single fully-populated dot column, a blank column and a pair of fully-populated columns for indicating finish of code. The single dot or double row of successive dots 28 in FIG. 2B, 38 in FIG. 3B, and 48 in FIG. 4B indicates the end of transmission and is printed prior to the symbol for end of code. The pattern of columns of dots for start and finish of the symbol may be varied to operate with the array or elements of the reader and also in timing sequence to allow for precise reading of the symbol.

In the matter of error detection, it can be seen from FIG. 4A, for example, that the reader 42 is sufficiently wide to cover any combination of eleven dots and/or spaces to always see a full 9-bit code. In the case of the letter "C," the reader 42 is moved toward the right and detects a code pattern for such letter which includes a single dot, a space, six dots and a space, which includes a space, six dots, a space and a single dot, and which includes six dots, a space, a single dot and a space. The several 9-bit groups are all detected and are complete patterns for the letter "C." If a different result is indicated for any one of these patterns, an error has occurred which may be caused by dirt, a missing dot, or an electronic failure of a sort. In any event, the operator would be alerted to sweep the wand across the code a second time. In this manner the error detection scheme works better when the reader sees at least one full n-bit code and preferably more than the minimum number of bits required to correctly identify a perfectly printed pattern. Various methods exist which use the error detection method as a base to perform error correction.

It is thus seen that herein shown and described is a high-density dot matrix code which has both repeated and non-repeated patterns in one direction representing characters to be read in a direction generally normal to the patterns. The code and the reading thereof enables the accomplishment of the objects and advantages mentioned above, and while a preferred embodiment of the invention (repeated pattern) and a modification thereof (non-repeated pattern) has been disclosed herein, other variations beyond those herein mentioned may occur to those skilled in the art. It is contemplated that all such variations not departing from the spirit and scope of the invention hereof are to be construed in accordance with the following claims.

What is claimed is:

1. A machine-readable code comprising a plurality of dots arranged in rows and columns in x and y directions to form a pattern representing characters in the Y direction and conveying information by presence or absence of a dot at a specific location, said pattern of dots being repeated in the Y direction for reading in a manner wherein the field of view of reading the pattern in the Y direction is less than the repeated pattern for a character.

2. The code of claim 1 wherein the dots are equally spaced in parallel rows and columns.

3. The code of claim 1 wherein the pattern includes a column of continuous dots and an adjacent blank column representing the start and finish of a code.

4. A machine-readable high-density information printed code comprising a plurality of blocks of dots arranged in rows and columns in X and Y directions to form a pattern by means of parallel columns of dots representing characters in the Y direction and conveying information by presence or absence of a dot at a specific location, said blocks of dots being repeated in the Y direction for reading in a manner wherein the field of view of reading the blocks in the Y direction is less than the repeated blocks of dots for the characters.

5. The code of claim 4 wherein the dots are equally spaced in parallel rows and columns in block form.

6. The code of claim 4 wherein the pattern includes a column of continuous dots in the Y direction representing the start of a code and an absence of dots along a column in said direction representing the end of a code.

7. The code of claim 4 where in the pattern of dots is repeated at least twice in the Y direction and reading is accomplished by viewing the pattern of dots substantially perpendicular to the rows of dots in the X direction.

8. The code of claim 4 wherein the pattern of dots is repeated at least twice in the Y direction and reading of the code is accomplished by optically sensing the pattern of dots substantially perpendicular to the rows of dots in the X direction.

* * * * *